(12) United States Patent
Bagchi

(10) Patent No.: US 7,881,275 B1
(45) Date of Patent: *Feb. 1, 2011

(54) RATE ADAPTATION

(75) Inventor: Sonali Bagchi, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/550,841

(22) Filed: Aug. 31, 2009

Related U.S. Application Data

(63) Continuation of application No. 11/305,875, filed on Dec. 16, 2005, now Pat. No. 7,583,649.

(60) Provisional application No. 60/707,791, filed on Aug. 12, 2005.

(51) Int. Cl.
*H04B 7/00* (2006.01)
*H04J 1/16* (2006.01)
*H04L 12/54* (2006.01)
*H04Q 11/00* (2006.01)

(52) U.S. Cl. .................. 370/338; 370/349; 370/412; 455/69; 455/450

(58) Field of Classification Search .......... 370/252, 370/277, 338, 349, 412, 465, 468, 474, 496; 455/69, 266, 452.2; 725/95
See application file for complete search history.

(56) References Cited

U.S. PATENT DOCUMENTS

| | | | |
|---|---|---|---|
| 6,975,655 B2 | 12/2005 | Fischer et al. | |
| 6,988,236 B2 | 1/2006 | Ptasinski et al. | |
| 7,095,754 B2 | 8/2006 | Benveniste | |
| 7,158,473 B2 | 1/2007 | Kurobe et al. | |
| 7,263,105 B2 | 8/2007 | Trainin | |
| 7,336,634 B2 | 2/2008 | del Prado et al. | |
| 7,355,976 B2 | 4/2008 | Ho et al. | |
| 7,463,583 B2 | 12/2008 | Hamdi | |
| 7,489,652 B2 | 2/2009 | Kwon et al. | |

(Continued)

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

(Continued)

*Primary Examiner*—Chi H Pham
*Assistant Examiner*—Ahmed Elallam

(57) ABSTRACT

A medium access control device includes a memory configured to store a plurality of sets of transmission parameters and a plurality of count values. A queue module is configured to store a plurality of frames. A control module is configured to receive a first frame of the plurality of frames from the queue module. A control module is configured to transmit the first frame using a first transmission parameter set of the plurality of sets of transmission parameters until at least one of successful transmission occurs, a number of unsuccessful transmissions is equal to one of the plurality of count values associated with the first transmission parameter set, and a predetermined period expires. The control module is configured to transmit the first frame using a second transmission parameter set in response to the first frame not being transmitted based on the first transmission parameter set.

18 Claims, 13 Drawing Sheets

U.S. PATENT DOCUMENTS

| | | | |
|---|---|---|---|
| 7,801,063 B2 * | 9/2010 | Hiddink et al. | 370/310 |
| 2002/0089959 A1 * | 7/2002 | Fischer et al. | 370/338 |
| 2002/0181637 A1 | 12/2002 | Nakabayashi | |
| 2003/0093526 A1 | 5/2003 | Nandagopalan et al. | |
| 2005/0086569 A1 | 4/2005 | Hiddink et al. | |
| 2005/0143027 A1 | 6/2005 | Hiddink et al. | |
| 2005/0143115 A1 | 6/2005 | Hiddink et al. | |
| 2005/0226239 A1 | 10/2005 | Nishida et al. | |
| 2006/0095944 A1 | 5/2006 | Demircin et al. | |
| 2006/0187885 A1 | 8/2006 | Roy et al. | |
| 2006/0203729 A1 | 9/2006 | Deshpande | |
| 2006/0209763 A1 | 9/2006 | Emeott et al. | |
| 2006/0258291 A1 * | 11/2006 | Nakata et al. | 455/67.11 |
| 2007/0002742 A1 | 1/2007 | Krishnaswamy et al. | |

OTHER PUBLICATIONS

IEEE Std 802.11a-1999 (Supplement to IEEE Std 802,Nov. 1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11b-1999/Cor 1-2001 (Corrigendum to IEEE Std 802.11-1999); IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 2: Higher-Speed Physical Layer (PHY) extension in the 2.4 GHz Band—Corrigendum 1; LAN/MAN Standards Committee of the IEEE Computer Society; Nov. 7, 2001; 23 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.11h—2003 (Amendment to IEEE Std 802.11, 1999 Edition (Reaff 2003)); as amended by IEEE Stds 802.11a-1999, 802.11b-1999, 802.11b-1999/Cor Jan. 2001, 802.11d-2001, and 802.11g-2003; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.

IEEE 802.11-04/0889r6; IEEE P802.11 Wireless LANs, Gn Sync Proposal Technical Specification; May 2005; 131 pages.

IEEE 802.20-PD-06, IEEE P 802.20TMV14, Draft 802.20 Permanent Document, System Requirements for IEEE 802.20 Mobile Broadband Wirelss Access Systems—Version 14; Jul. 16, 2004; 23 pages.

IEEE Std. 802.16/2004 (Revision of IEEE Std. 802.16/2001), IEEE Standard for Local and metropolitan area networks, Part 16: Air Interface for Fixed Broadband Wireless Access Systems; IEEE Computer Society and the IEEE Microwave Theory and Techniques Society; Oct. 1, 2004; 893 pages.

* cited by examiner

TX MODE Register

| Field | Bits | Type/ HW Rst | Description |
|---|---|---|---|
| DisableRateDrop | [1] | RW 0x0 | 0 = Use auto rate drop scheme (default), 1 = Use rate specified directly in RateInfo field of TxInfo. |

Transmission Information

| Field | Subfield | Description |
|---|---|---|
| RetryCnt | [7:0] | SW sets to indicate number of transmit attempts. HW returns the number of retries done for this frame. |
| RetryDone | [7:0] | SW sets to 0. HW returns the number of transmission attempts made for this frame. |
| RateInfo | [15:0] | RateInfo to be used when auto rate drop is disabled. |
| Rate drop table pointer | [31:0] | The memory location of the rate drop table for the current frame. |
| TxParam | [12] | NoRateDrop 0 = Use auto rate drop scheme, 1 = Use static RateInfo field. |

108 ↗ RetryCnt
110 ↗ RetryDone
106 ↗ RateInfo
104 ↗ Rate drop table pointer
112 ↗ TxParam
114 ↗

FIG. 7

Auto Rate Drop Table

| Field | Bits | Description |
|---|---|---|
| RateChange 0 | [31:0] | Rate change information for Round 1 of retries. |
| RateChange 1 | [31:0] | Rate change information for Round 2 of retries. |
| RateChange 2 | [31:0] | Rate change information for Round 3 of retries. |
| RateChange 3 | [31:0] | Rate change information for Round 4 of retries. |

FIG. 8

RateChange[31:0] Field Definition

| Subfield | Bits | Description |
|---|---|---|
| RateInfo | [15:0] | RateInfo<br>The RateInfo data to be used for this round of retries. |
| | [23:16] | Reserved. |
| Count | [27:24] | Count<br>Number of retries to attempt before next change in rate.<br>Note: This subfield is:<br>Defined for RateChange 0-2.<br>Reserved for RateChange 3. |
| | [30:28] | Reserved. |
| | [31] | DropFrame<br>Set to 1 by SW to indicate that frame is to be dropped without any transmission attempts. SW may use this bit as a mechanism for deleting the frame after is has been queued, but before it has been fetched by HW.<br>Note: This subfield is:<br>Defined for RateChange 0.<br>Reserved for RateChange 1-3. |

FIG. 9

RateInfo[31:0] Field Definition

| Subfield | Bits | Description |
|---|---|---|
| Format | [0] | 0 = Legacy Format<br>1 = Hi-throughput format. |
| ShortGI | [1] | 0 = Use standard guard interval,<br>1 = Use short guard interval. |
| BW | [2] | 0 = Use 20 MHz channel,<br>1 = Use 40 MHz channel. |
| RateID/MCS | [8:3] | = RateID[3:0]; Legacy format,<br>= MCS[5:0]; HT format. |
| AdvCoding | [10:9] | AdvCoding<br>0 = No AdvCoding,<br>1 = LDPC,<br>2 = RS,<br>3 = Reserved. |
| AntSelect | [12:11] | Bitmap to select transmit antennae. |
| ActSubCh | [14:13] | Active 20 MHz sub-channels in the 40 MHz channel, when BW = 1.<br>00 = Lower sub-channel,<br>01 = Upper sub-channel,<br>1x = Identical 802.11a/b/g transmission on both upper and lower sub-channels. |
| PreambleType | [15] | PreambleType for legacy format<br>0 = Transmit using Long Preamble,<br>1 = Transmit using Short Preamble. |

FIG. 10

Rate Drop Update Register

| Field | Bits | Type/HW Rst | Description |
|---|---|---|---|
| UpdateDropTable | [0] | RW 0x0 | SW writes 0x1 to cause HW to read new rate drop table. HW will also fetch table if rate drop pointer value has changed.<br><br>HW clears bit after fetching rate drop table. |

152 ↗

FIG. 11

RATE ADAPTATION

CROSS-REFERENCE TO RELATED APPLICATIONS

This application is a continuation of U.S. patent application Ser. No. 11/305,875, filed Dec. 16, 2005, which claims the benefit of U.S. Provisional Application No. 60/707,791, filed Aug. 12, 2005, which are hereby incorporated by reference in their entirety.

FIELD OF THE INVENTION

The present invention relates to wireless communications systems, and more particularly to adjustable transfer rates for frames in wireless communications systems.

BACKGROUND OF THE INVENTION

Referring now to FIG. 1, an exemplary block diagram of a network interface 10 includes a medium access control (MAC) device 12 that communicates with a physical layer device 14 (or PHY). The physical layer device 14 selectively communicates with one or more antennae 16 in order to transmit and receive radio frequency (RF) signals through a wireless medium. The MAC device 12 also communicates with a host 18 and receives data from the host 18 for transmission. The MAC device 12 processes the data and encodes frames according to a pre-established protocol. For example, the MAC device 12 may generate frames according to IEEE 802.11, 802.11a, 802.11b, 802.11g, 802.11h, 802.11n, 802.16, and/or 802.20, which are all hereby incorporated by reference in their entireties.

Since frames may be of different types and may correspond to different Quality of Service (QoS) priority levels, the MAC device 12 includes a queue module 20. Frames that are intended for transmission through the wireless medium are first written by firmware into several queues within the queue module 20. These frames are then scheduled for transmission according to a set of scheduler rules using the queues' priority levels.

Referring now to FIG. 2, the queue module 20 includes an exemplary transmit queue 28. Frames awaiting transmission on the wireless network are stored in the transmit queue 28. For illustrative purposes, the transmit queue 28 is shown with six frames, although a larger or smaller number of frames is possible. Each of the frames includes a transmission information portion 30 and a frame body portion 32. The transmission information portion 30 includes headers and/or fields that are applicable to the transmission characteristics, including transfer rate, of the frame.

The frame body portion 32 is the actual body of the frame and includes any data (payload) that is being transmitted. In various implementations, the queue module includes multiple transmit and/or receive queues. For example, frames that are encoded according to a first coding scheme may be stored in a first transmit queue and frames that are encoded according to a second coding scheme may be stored in a second transmit queue.

A desired transmit rate for a frame is conveyed by firmware to the MAC hardware via one or more fields in the transmission information portion 30 of the frame. Referring now to FIGS. 3A and 3B, the desired transmit rate for a frame is indicated in the PHY preamble via one or more fields such as LT-SIG, HT-SIG1, HT-SIG2. FIG. 3A illustrates an exemplary legacy signal field LT-SIG in the PHY preamble of a frame encoded in an IEEE 802.11 legacy mode format. For example, frames encoded according to IEEE 802.11a, 802.11b, and/or 802.11g standards may be in a legacy mode format. In this case, the transmit rate of the frame is identified by eight bits of a Rate field 40 (identified as LT-SIG in FIG. 3A) included in the LT-SIG 30-1. In various implementations, a total of fourteen legacy rates are supported. Rate information is specified by firmware by writing an index (between 0 and 13) into the 4-bit Rate field 60 in the transmission information portion of the queued frame. The MAC hardware provides the corresponding 8-bit encoded value to the PHY to use in the Rate field 40 of LT-SIG.

Frames may also be encoded in a high throughput (HT) mode format. For example, frames encoded according to IEEE 802.11n should be in an HT mode format. IEEE 802.11n is directed towards wireless communications systems that take advantage of spatial diversity multiplexing (or multipath) by utilizing multiple transmit and/or receive antennae 16. FIG. 3B illustrates exemplary HT signal fields HT-SIG1 and HT-SIG2 in the PHY preamble of a frame encoded in an IEEE HT mode format. Since frames in an HT mode format may be transmitted and/or received by multiple antennae 16, there are several parameters that contribute to the overall transmit rate that is achieved.

Frames encoded in an IEEE HT mode format include first and second signal fields 42 and 44, respectively, that are transmitted back-to-back (identified in FIG. 3B as HT-SIG1 and HT-SIG2). The first signal field (HT-SIG1) includes a modulation coding scheme (MCS) field 46 and 20/40 BW field 50. The MCS field 46 is defined by seven bits and conveys the number of spatial streams (e.g., 1, 2, 3, or 4), a modulation scheme (e.g., BPSK, QPSK, 16-QAM, or 256-QAM), and a coding rate (e.g., 1/2, 3/4, 2/3, or 7/8), which all contribute to transmit rate. The 20/40 BW field 50 identifies whether the current bandwidth (BW) is 20 MHz or 40 MHz. The second signal field 44 (HT-SIG2) includes Short GI field 48. The Short GI field 48 identifies whether a short guard interval (GI) is used. Guard interval status and bandwidth both also contribute to transmit rate. For an HT frame, the firmware specifies the rate information by writing to the MCS, BW, GI sub-fields included in the RateInfo field 106 in the transmission information portion of the queued frame.

The MAC device 12 generally sets the transmit rate of a frame by firmware encoding the appropriate fields in the transmission information portion 30 of the frame before storing the frame in the transmit queue 28. However, the conditions of multiple wireless channels that are utilized by spatial diversity multiplexing systems are capable of changing due to many factors, including obstruction and line-of-sight (LOS) losses. When wireless channel quality degrades, the MAC device 12 may not receive the acknowledgement (ACK), indicating successful transmission of a frame, from a remote network interface. It is also possible that a negative acknowledgement (NACK) may be received from the remote network interface, but this mechanism becomes less reliable as channel quality degrades.

When a frame has not been successfully acknowledged, conventional wireless communications systems may attempt to retransmit the frame. However, the conditions of the wireless channel may not be able to support the desired transmit rate encoded in the frame. A further limitation is that the MAC device 12 is typically incapable of adjusting transmission parameters of the frame once the frame has been stored in the transmit queue 28.

SUMMARY OF THE INVENTION

A medium access control (MAC) device comprises memory, a queue module, and a control module. Memory stores N transmission parameter specifications and N−1 count values, each count value being associated with one of the N specifications, where N is an integer greater than one. The queue module stores a plurality of frames. The control module receives a first frame of the plurality of frames from the queue module and selectively attempts to transmit the first frame using a first specification of the N specifications until at least one of successful transmission occurs, a number of unsuccessful transmissions is equal to one of the N−1 count values associated with the first specification, and a predetermined period expires. The control module selectively attempts to transmit the first frame using a second specification of the N specifications when transmission of the first frame is unsuccessful using the first specification.

In other features, the transmission parameter specifications include transmission rate. The transmission parameter specifications further include at least one of guard interval selection, antenna selection, preamble type, bandwidth, and active sub-channel selection. The control module includes a frame drop indicator, and the control module selectively drops a queued frame based upon the frame drop indicator.

In further features, the first frame is stored in the queue module with a fixed transmission parameter specification. Each of the plurality of frames is stored with a rate adaptation override indicator where, based upon the rate adaptation override indicator, the control module attempts to transmit the first frame using the fixed specification instead of one of the N specifications.

In still other features, the control module includes a rate adaptation override indicator and each of the plurality of frames is stored in the queue module with a respective fixed transmission parameter specification, and based upon the rate adaptation override indicator, the control module will attempt transmission of any one of the plurality of frames using a respective fixed specification instead of using one of the N specifications.

In other features, the control module iteratively attempts to transmit the first frame using one of the N specifications for a respective one of the count values. Then the control module repeats using a next one of the N specifications. The iteration continues until each of the N specifications have been used or transmission is successful.

In further features, a counter updates each time attempted transmission of a frame is unsuccessful. Attempted transmission is unsuccessful when an acknowledgement is not received. Each of the plurality of frames is stored in the queue module with a remaining count value that indicates total number of transmission attempts remaining. The control module regards transmission of a frame as failed once a respective remaining count value reaches zero.

In still other features, when a second frame is stored in the queue module, a respective remaining count value is set to a desired value indicating the number of times the control module should attempt to transmit the second frame. The remaining count value is decremented after each unsuccessful transmission attempt. Each of the plurality of frames is stored with a cumulative count value that indicates total number of unsuccessful transmission attempts.

In other features, when a frame is first stored in the queue module, a respective cumulative count value is set to zero. The cumulative count value is incremented after each unsuccessful transmission attempt. The cumulative count value of a second frame is used to initialize the counter if transmission of the second frame had previously been suspended.

In further features, the memory contains a plurality of tables, each table containing a set of N transmission parameter specifications and N−1 count values. Each of the plurality of frames is stored in the queue module with a pointer that points to a starting address within the memory of one of the plurality of tables. The control module uses N transmission parameter specifications and N−1 count values from one of the plurality of tables pointed to by the first frame's pointer when attempting to transmit the first frame.

In still other features, N is a multiple of four. One of the plurality of tables referenced by the first frame's pointer is read from the memory into temporary storage. The one of the plurality of tables is not read into the temporary storage if the one of the plurality of tables was read for a previous frame and is still in the temporary storage. Based upon an updated table indicator, the one of the plurality of tables is read into the temporary storage regardless of current contents of the temporary storage.

In other features, each of the plurality of tables is associated with a respective frame drop signal, and the control module drops the first frame based upon a respective frame drop signal of one of the plurality of tables referenced by the first frame's pointer. The MAC device is otherwise compliant with at least one of IEEE 802.11, 802.11a, 802.11b, 802.11g, 802.11h, 802.11n, 802.16, and 802.20 standards.

In further features, a network interface comprises the MAC device. The network interface further comprises a physical layer device that communicates radio frequency (RF) signals through a wireless medium. The physical layer device communicates the RF signals through at least one of a plurality of transmit antennae and a plurality of receive antennae.

A method for transmitting frames comprises storing N transmission parameter specifications and N−1 count values, each count value being associated with one of the N specifications, where N is an integer greater than one; receiving a first frame of a plurality of frames; selectively attempting to transmit the first frame using a first specification of the N specifications until at least one of successful transmission occurs, a number of unsuccessful transmissions is equal to one of the N−1 count values associated with the first specification, and a predetermined period expires; and selectively attempting to transmit the first frame using a second specification of the N specifications when transmission of the first frame is unsuccessful using the first specification.

In other features, the transmission parameter specifications include transmission rate. The transmission parameter specifications further include at least one of guard interval selection, antenna selection, preamble type, bandwidth, and active sub-channel selection. The method includes dropping the first frame based upon a frame drop indicator. The first frame includes a fixed transmission parameter specification.

In further features, each of the plurality of frames includes a rate adaptation override indicator, and the method further comprises attempting to transmit the first frame using the fixed specification instead of one of the N specifications based upon the rate adaptation override indicator. Each of the plurality of frames includes a respective fixed transmission parameter specification, and the method further comprises attempting to transmit any one of the plurality of frames using a respective fixed specification instead of using one of the N specifications based upon the rate adaptation override indicator for the one of the plurality of frames.

In still other features, attempting to transmit includes iteratively attempting to transmit the first frame using one of the N specifications for a respective one of the count values, at which point the control module repeats using a next one of the N specifications, iteration continuing until each of the N specifications have been used or transmission is successful. The method includes updating a counter each time attempted transmission of the first frame is unsuccessful.

In other features, attempted transmission is unsuccessful when an acknowledgement is not received. Each of the plurality of frames includes a remaining count value that indicates total number of transmission attempts remaining. The method includes regarding transmission of a frame as failed once a respective remaining count value reaches zero. The method includes decrementing the remaining count value after each unsuccessful transmission attempt.

In further features, each of the plurality of frames includes a cumulative count value that indicates total number of unsuccessful transmission attempts. The method includes incrementing the cumulative count value after each unsuccessful transmission attempt. The method includes using the cumulative count value of one of the plurality of frames to initialize the counter if transmission of the one of the plurality of frames had previously been suspended.

In still other features, the storing includes storing a plurality of tables, each table containing a set of N transmission parameter specifications and N−1 count values, and each of the plurality of frames includes a pointer that points to a starting address of one of the plurality of tables. Attempting to transmit uses N transmission parameter specifications and N−1 count values from one of the plurality of tables that is pointed to by the first frame's pointer when attempting to transmit the first frame.

In other features, N is a multiple of four. The method includes selectively loading one of the plurality of tables referenced by the first frame's pointer. The loading is not performed when the one of the plurality of tables was loaded for a previous frame and is still available for use. The loading is performed regardless of availability of the one of the plurality of tables based upon an updated table indicator.

In further features, each of the plurality of tables includes a respective frame drop signal, and further comprises dropping the first frame based upon a respective frame drop signal of one of the plurality of tables referenced by the first frame's pointer. The method is otherwise compliant with at least one of IEEE 802.11, 802.11a, 802.11b, 802.11g, 802.11h, 802.11n, 802.16, and 802.20 standards.

A medium access control (MAC) device comprises memory means, queuing means, and control means. The memory means is for storing N transmission parameter specifications and N−1 count values, each count value being associated with one of the N specifications, where N is an integer greater than one. The queuing means is for storing a plurality of frames. The control means is for receiving a first frame of the plurality of frames from the queuing means and selectively attempting to transmit the first frame using a first specification of the N specifications until at least one of successful transmission occurs, a number of unsuccessful transmissions is equal to one of the N−1 count values associated with the first specification, and a predetermined period expires. The control means is also for selectively attempting to transmit the first frame using a second specification of the N specifications when transmission of the first frame is unsuccessful using the first specification.

In other features, the transmission parameter specifications include transmission rate. The transmission parameter specifications further include at least one of guard interval selection, antenna selection, preamble type, and bandwidth. The control means includes a frame drop indicator, and the control means selectively drops the first frame based upon the frame drop indicator.

In further features, the first frame is stored in the queuing means with a fixed transmission parameter specification. Each of the plurality of frames is stored with a rate adaptation override indicator where, based upon the rate adaptation override indicator, the control means attempts to transmit the first frame using the fixed specification instead of one of the N specifications.

In still other features, the control means includes a rate adaptation override indicator and each of the plurality of frames is stored in the queuing means with a respective fixed transmission parameter specification, and based upon the rate adaptation override indicator, the control means will attempt transmission of any one of the plurality of frames using a respective fixed specification instead of using one of the N specifications.

In other features, the control means iteratively attempts to transmit the first frame using one of the N specifications for a respective one of the count values. Then the control means repeats using a next one of the N specifications. The iteration continues until each of the N specifications have been used or transmission is successful.

In further features, counting means is for tracking unsuccessful attempted transmissions of the first frame. Attempted transmission is unsuccessful when an acknowledgement is not received. Each of the plurality of frames is stored in the queuing means with a remaining count value that indicates total number of transmission attempts remaining. The control means regards transmission of a frame as failed once a respective remaining count value reaches zero.

In still other features, when a second frame is stored in the queuing means, a respective remaining count value is set to a desired value indicating the number of times the control means should attempt to transmit the second frame. The remaining count value is decremented after each unsuccessful transmission attempt. Each of the plurality of frames is stored with a cumulative count value that indicates total number of unsuccessful transmission attempts.

In other features, when a frame is first stored in the queuing means, a respective cumulative count value is set to zero. The cumulative count value is incremented after each unsuccessful transmission attempt. The cumulative count value of a second frame is used to initialize the counting means if transmission of the second frame had previously been suspended.

In further features, the memory means contains a plurality of tables, each table containing a set of N transmission parameter specifications and N−1 count values. Each of the plurality of frames is stored in the queuing means with a pointer that points to a starting address within the memory means of one of the plurality of tables. The control means uses N transmission parameter specifications and N−1 count values from one of the plurality of tables pointed to by the first frame's pointer when attempting to transmit the first frame.

In still other features, N is a multiple of four. One of the plurality of tables referenced by the first frame's pointer is read from the memory means into temporary storage means. The one of the plurality of tables is not read into the temporary storage means if the one of the plurality of tables was read for a previous frame and is still in the temporary storage means. Based upon an updated table indicator, the one of the plurality of tables is read into the temporary storage means regardless of current contents of the temporary storage means.

In other features, each of the plurality of tables is associated with a respective frame drop signal, and the control means drops the first frame based upon a respective frame drop signal of one of the plurality of tables referenced by the first frame's pointer. The MAC device is otherwise compliant with at least one of IEEE 802.11, 802.11a, 802.11b, 802.11g, 802.11h, 802.11n, 802.16, and 802.20 standards.

In further features, a network interface comprises the MAC device. The network interface further comprises physical layer means for communicating radio frequency (RF) signals through a wireless medium. The physical layer means communicates the RF signals through at least one of a plurality of transmit antennae and a plurality of receive antennae.

A computer program executed by a processor comprises storing N transmission parameter specifications and N−1 count values, each count value being associated with one of the N specifications, where N is an integer greater than one; receiving a first frame of a plurality of frames; selectively attempting to transmit the first frame using a first specification of the N specifications until at least one of successful transmission occurs, a number of unsuccessful transmissions is equal to one of the N−1 count values associated with the first specification, and a predetermined period expires; and selectively attempting to transmit the first frame using a second specification of the N specifications when transmission of the first frame is unsuccessful using the first specification.

In other features, the transmission parameter specifications include transmission rate. The transmission parameter specifications further include at least one of guard interval selection, antenna selection, preamble type, bandwidth, and active sub-channel selection. The computer program includes dropping the first frame based upon a frame drop indicator. The first frame includes a fixed transmission parameter specification.

In further features, each of the plurality of frames includes a rate adaptation override indicator, and the computer program further comprises attempting to transmit the first frame using the fixed specification instead of one of the N specifications based upon the rate adaptation override indicator. Each of the plurality of frames includes a respective fixed transmission parameter specification, and the computer program further comprises attempting to transmit any one of the plurality of frames using a respective fixed specification instead of using one of the N specifications based upon the rate adaptation override indicator for the one of the plurality of frames.

In still other features, attempting to transmit includes iteratively attempting to transmit the first frame using one of the N specifications for a respective one of the count values, at which point the control module repeats using a next one of the N specifications, iteration continuing until each of the N specifications have been used or transmission is successful. The computer program includes updating a counter each time attempted transmission of the first frame is unsuccessful.

In other features, attempted transmission is unsuccessful when an acknowledgement is not received. Each of the plurality of frames includes a remaining count value that indicates total number of transmission attempts remaining. The computer program includes regarding transmission of a frame as failed once a respective remaining count value reaches zero. The computer program includes decrementing the remaining count value after each unsuccessful transmission attempt.

In further features, each of the plurality of frames includes a cumulative count value that indicates total number of unsuccessful transmission attempts. The computer program includes incrementing the cumulative count value after each unsuccessful transmission attempt. The computer program includes using the cumulative count value of one of the plurality of frames to initialize the counter if transmission of the one of the plurality of frames had previously been suspended.

In still other features, the storing includes storing a plurality of tables, each table containing a set of N transmission parameter specifications and N−1 count values, and each of the plurality of frames includes a pointer that points to a starting address of one of the plurality of tables. Attempting to transmit uses N transmission parameter specifications and N−1 count values from one of the plurality of tables that is pointed to by the first frame's pointer when attempting to transmit the first frame.

In other features, N is a multiple of four. The computer program includes selectively loading one of the plurality of tables referenced by the first frame's pointer. The loading is not performed when the one of the plurality of tables was loaded for a previous frame and is still available for use. The loading is performed regardless of availability of the one of the plurality of tables based upon an updated table indicator.

In further features, each of the plurality of tables includes a respective frame drop signal, and further comprises dropping the first frame based upon a respective frame drop signal of one of the plurality of tables referenced by the first frame's pointer. The computer program is otherwise compliant with at least one of IEEE 802.11, 802.11a, 802.11b, 802.11g, 802.11h, 802.11n, 802.16, and 802.20 standards.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a table illustrating one possible configuration of the TX MODE register including a DisableRateDrop field that is capable of disabling the rate adaptation system;

FIG. 7 is a table illustrating an exemplary transmission information portion of a frame including a rate drop table pointer that identifies a rate drop table stored in the memory module;

FIG. 8 is a table illustrating an exemplary auto rate drop table stored in the memory module that includes multiple tiered transmit parameters;

FIG. 9 is a table illustrating exemplary contents of each entry in the auto rate drop table including transmission parameters and an associated retry count;

FIG. 10 is a table illustrating an exemplary frame transmit parameter field;

FIG. 11 is a table illustrating an exemplary configuration of a Rate Drop Update register including an UpdateDropTable field that is capable of alerting the rate adaptation module of changes in the auto rate drop table;

DETAILED DESCRIPTION OF THE PREFERRED EMBODIMENTS

Figure 1:
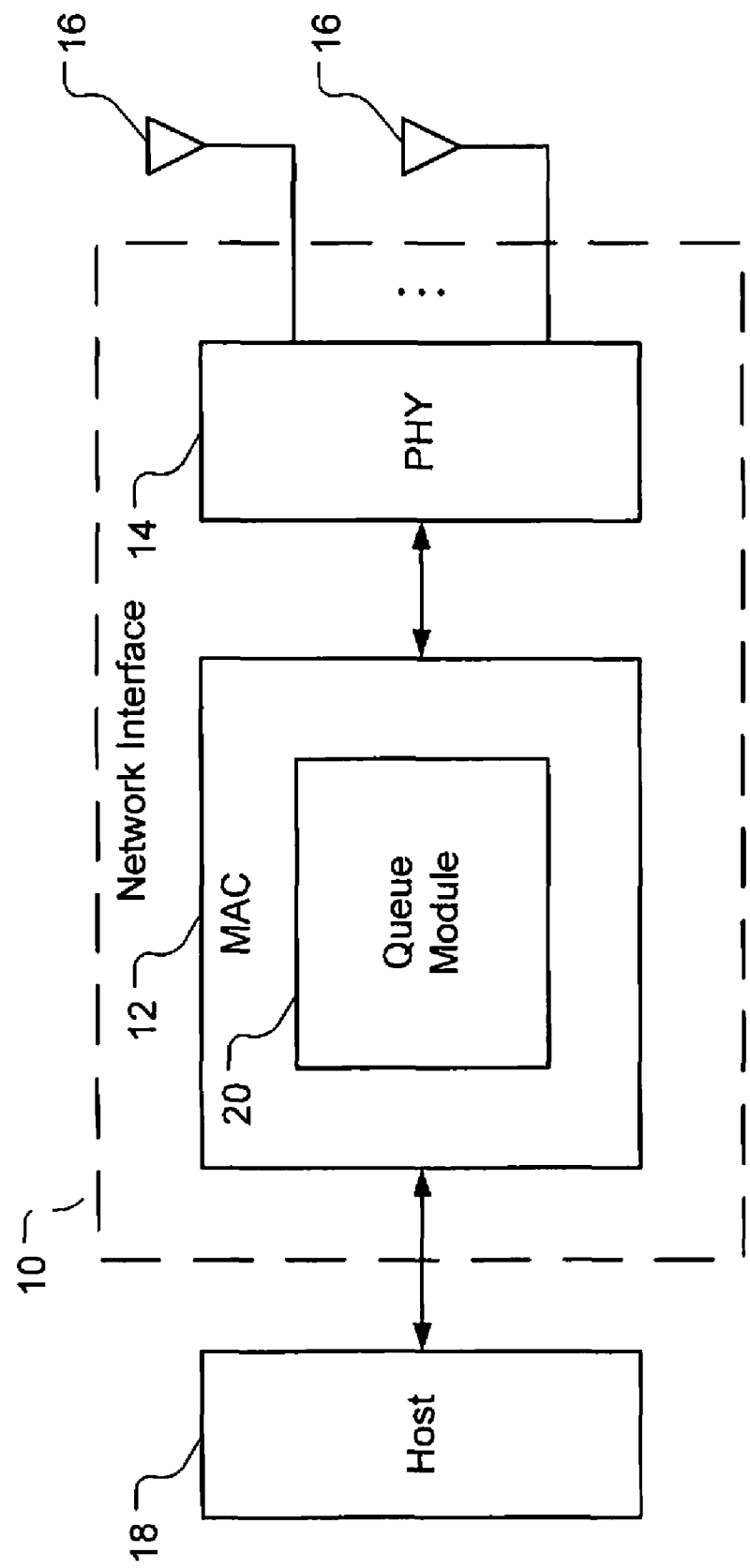
FIG. 1 is a functional block diagram of an exemplary wireless network interface that includes multiple transmit/receive antennae according to the prior art.
Figure 2:
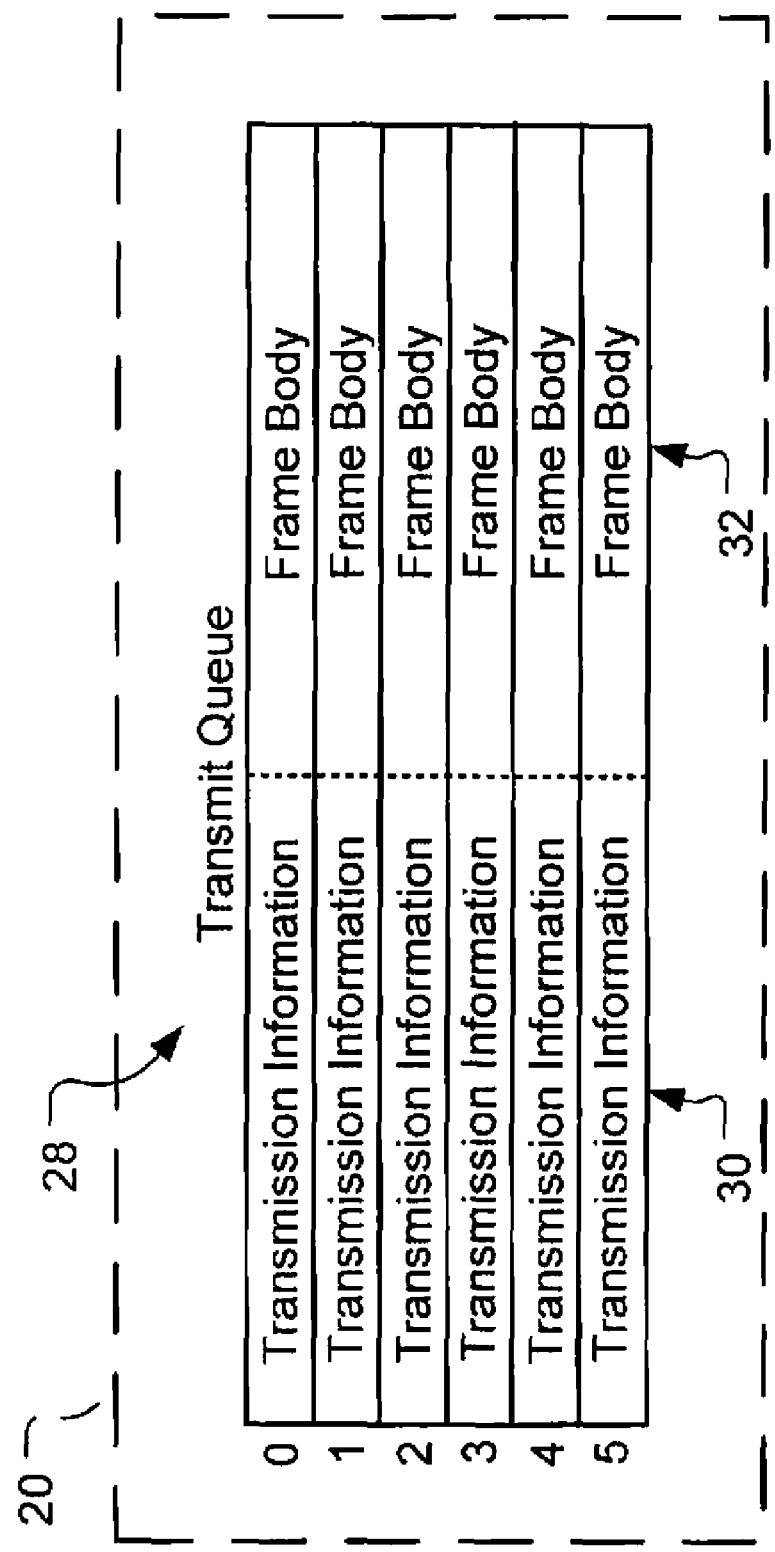
FIG. 2 is a functional block diagram of an exemplary transmit queue that is included in the queue module of FIG. 1 according to the prior art.
Figure 3:
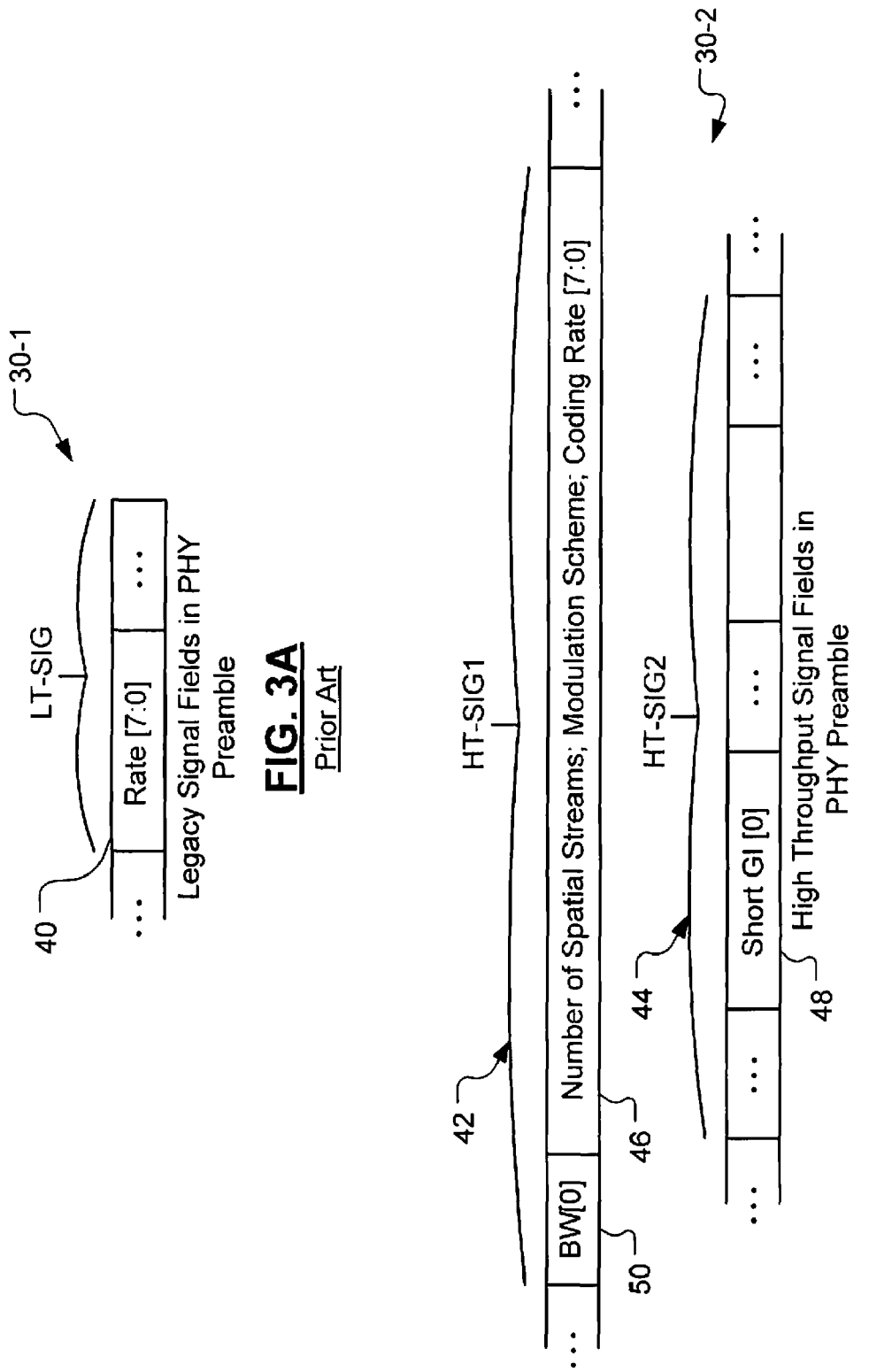
FIG. 3A illustrates an exemplary legacy signal field in the PHY preamble portion of a frame that is encoded in an IEEE legacy mode format according to the prior art.
FIG. 3B illustrates exemplary high throughput signal fields in the PHY preamble portion of a frame that is encoded in an IEEE high throughput (HT) mode format according to the prior art.

The following description of the preferred embodiments is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

Figure 4:
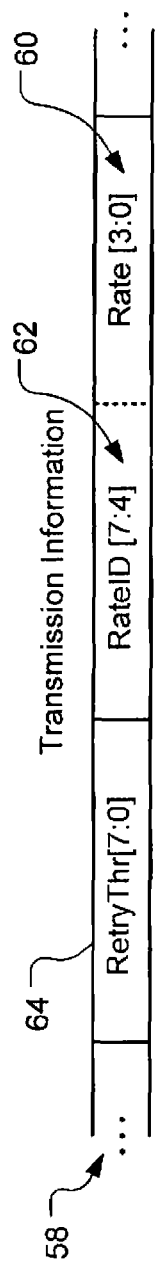
FIG. 4 illustrates an exemplary transmission information portion of a frame including a single alternate transmit rate according to the present invention.

Referring now to FIG. 4, in an exemplary implementation, a transmission information portion 58 of a frame includes a first rate value 60 (Rate), a second rate value 62 (RateID), and a retry threshold 64 (RetryThr). In various implementations, the first rate 60 occupies bits 3 to 0 of a field and the second rate 62 occupies bits 7 to 4 of the same field. The retry threshold 64 occupies bits 7 to 0 of a second field. Register and bit assignments may differ from the exemplary implementations presented here without departing from the principles of the present invention. Non-limiting examples include storing values in different registers or different fields, using more or fewer bits to store a value, using different numerical values to indicate the same setting, and multiplexing multiple settings within a single group of bits.

During normal operating conditions, the frame is sent at the first rate 60. If an ACK is not received, the frame is resent at the same rate 60. The retry threshold 64 identifies how many times the frame may be resent at the current rate 60. Once the number of consecutive retries reaches the retry threshold 64, the frame is resent at the second rate 62.

In a wireless channel, transmitting a frame at a lower rate typically increases the likelihood that an ACK will be received. Therefore, the second rate 62 is generally lower than the first rate 60. The implementation illustrated in FIG. 4 provides for a greater degree of rate flexibility, though it is still limited to a single alternate rate 62. When wireless channel conditions are very adverse, however, even the alternative rate 62 may be too high.

Figure 5:
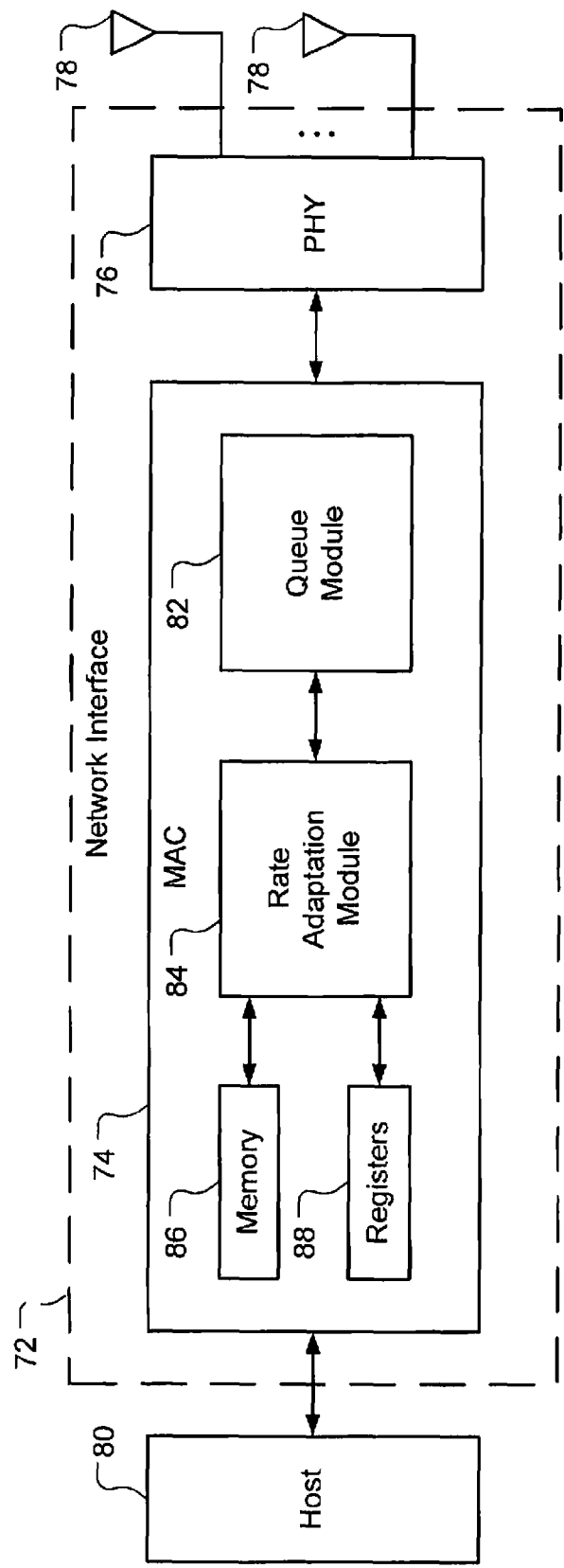
FIG. 5 is a functional block diagram of an exemplary wireless network interface including a rate adaptation module and an associated memory module according to the present invention.

Referring now to FIG. 5, a tiered automatic transmit rate adjustment system according to the present invention allows the transmission parameters of a frame to be adjusted an arbitrary number of times to ensure successful transmission of the frame. An exemplary network interface 72 includes a medium access control (MAC) device 74 that communicates with a physical layer device (PHY) 76. The physical layer device 76 selectively communicates with one or more antennae 78 in order to transmit and receive radio frequency (RF) signals through a wireless medium. The MAC device 74 receives data from a host 80 for communication over a wireless network via the antennae 78.

The MAC device 74 processes the data and encodes frames according to a pre-established protocol. For example, the MAC device 74 may generate frames that are compliant with IEEE 802.11, 802.11a, 802.11b, 802.11g, 802.11h, 802.11n, 802.16, 802.20, and/or other present and future standards. The MAC device 74 stores encoded frames that are ready for transmission in a queue module 82. In various implementations, the queue module 82 includes multiple transmit and/or receive queues that are each capable of handling varying groups of frames. The MAC device 74 further includes a rate adaptation module 84, a memory module 86, and a register module 88. During normal operation, the rate adaptation module 84 reads the frame that is to be next transmitted from the queue module 82. The rate adaptation module 84 then determines rate parameters used to transmit the frame.

In various implementations according to the principles of the present invention, transmit parameters for the frames are no longer simply stored in static fields. Instead, each frame includes a pointer that identifies a location in the memory module 86 where a table containing transmission parameters is stored. This table can include more than a single alternative transmit rate to be used in the event that the MAC device 74 is unsuccessful at transmitting the frame at the original rate. For example, the table may include a first set of transmission parameters, a second set of parameters to be used after a specified number of failed transmission attempts, a third set of parameters to be used after a specified number of further failed transmission attempts, etc.

Each set of transmission parameters stored in the tables of the memory module 86 are stored with an associated count value. The count value identifies the number of times that the MAC device 74 may consecutively attempt to resend a frame using the corresponding transmission parameters before changing to the next set of transmission parameters. Each set of transmission parameters will generally have a lower transmission rate than the previous set to account for the continued failed transmission of the frame. The register module 88 includes a plurality of registers that are utilized by the MAC device 74 for system control, including control of the rate adaptation module 84, as described below.

The register module 88 includes a 32-bit register called TX MODE, the relevant portion of which is depicted in FIG. 6. The TX MODE register includes a field called DisableRateDrop (bit 1 of the TX MODE register in this implementation) 96. A nonzero value for DisableRateDrop 96 indicates that the automatic rate adjustment system is disabled. By default, DisableRateDrop is cleared and thus the rate adjustment system is initially enabled. Even when the rate adjustment system is disabled, the MAC device 74 is still able to transmit frames. This is because the frames contain a fixed transmission parameter field, which can be used by the MAC device 74. Under most circumstances, these fixed fields are only utilized when the rate adjustment system is disabled.

Referring now to FIG. 7, a transmission information portion according to the present invention of a frame includes a pointer field (Rate drop table pointer) 104 as well as a fixed transmission parameter field (RateInfo) 106. As discussed above, the fixed transmission parameters 106 are used when the rate adaptation system is disabled. Otherwise, when the rate adaptation system is enabled, the rate adaptation module 84 fetches a transmission parameter table (or rate drop table) from the location in the memory module 86 that is identified by the frame's pointer field 104. In various implementations, the pointer field 104 is a 32-bit value.

The transmission information portion of the frame also includes two count fields, RetryCnt 108 and RetryDone 110. RetryCnt 108 is written when the frame is first queued by software, and indicates the maximum number of times transmission of the frame should be attempted. RetryDone 110 is set to zero when the frame is queued by software, and indicates the total number of times transmission has been attempted for the frame. RetryDone 110 retains the total number of transmit attempts, which is useful if transmission of the frame is delayed and the frame has to be requeued, such as when a higher priority transmission, like a beacon transmission, interrupts. In this way, when transmission of the frame resumes, the rate adaptation system resumes transmitting with the previous parameters.

The transmission information portion of the frame also includes a field TxParam 112, which in turn includes a subfield NoRateDrop (bit 12 of the TxParam field in one implementation) 114. The subfield NoRateDrop 114 allows rate adaptation to be disabled with respect to individual frames. This is in contrast to globally disabling rate adaptation for all frames via the DisableRateDrop field 96 in the TX MODE register.

Referring now to FIG. 8, an exemplary transmit rate table 120, which is stored in the memory module 86, is shown. This table is selected when a frame's transmission information includes a pointer (Rate drop table pointer field 104) to the starting address of this table. While the implementation shown in FIG. 8 includes four sets (RateChange fields) of transmission parameters and count values, the memory module 86 is capable of storing a larger number (e.g., eight or sixteen). Additionally, the memory module 86 may include multiple transmit rate tables, each accessible by storing a different value to the pointer field 104.

Using a memory module 88 that is separate from storage for queued frames to indicate transmission parameters allows the parameters to be accessed and/or updated by the MAC device 74 at any time. For example, the memory module 88 is remotely located from the Queue module 82. Conversely, frames cannot typically be accessed or updated once they are stored in a transmit queue. Therefore, even after a frame has been queued (but not yet fetched for transmission), the transmission parameters with which the frame will be transmitted can be programmed by the MAC device 74. In various implementations, a device may include only one rate table 120. In these implementations, frames may not have a pointer, as there is only one rate table 120.

Referring now to FIG. 9, an exemplary bit assignment for each of the entries (RateChange fields) in the transmit rate table of FIG. 8 is shown. A 16-bit transmission parameter subfield (RateInfo) 122 includes transmit parameters, described in detail below. A 4-bit count subfield (Count) 124 identifies the maximum number of times that a frame utilizing the transmission parameters identified by the RateInfo subfield 122 may be resent before progressing to the next RateChange field.

The MAC device 74 first attempts to transmit a frame using the transmission parameters (RateInfo) of the first entry in the rate drop table 120 (RateChange 0). If transmission is unsuccessful, the MAC device 74 retries transmission and compares the number of retries to the value of the Count subfield 124 of RateChange 0. When the number of retries reaches Count 124 of RateChange 0, the MAC device 74 progresses to the second entry in the rate drop table 120 (RateChange 1). Once the number of retries at this second RateChange reaches the Count 124 of RateChange 1, the MAC device progresses to the third entry in the rate drop table 120 (RateChange 2). This process continues until the last table entry is reached. Count 124 is not defined for the final table entry-transmission will continue using the final RateInfo until the maximum number of retries (RetryCnt) is exhausted.

The rate drop table 120 also allows a frame to be deleted after it has been queued for transmission. A DropFrame subfield 126 of the RateChange field is defined (bit 31 of the RateChange field in one implementation). When the DropFrame subfield 126 has a nonzero value, the MAC device 74 drops the frame without any transmission attempts. Because this drop will happen prior to attempting transmission at any rate, the DropFrame subfield 126 is defined only for the first table entry (RateChange 0).

Referring now to FIG. 10, exemplary transmission parameters (RateInfo) are depicted. RateInfo is specified statically in the transmission information portion of the frame (when rate adaptation is disabled) and is specified for each entry in each drop rate table (for use with rate adaptation). While the system depicted in FIG. 4 executed automatic transmit rate drops simply by changing a 4-bit RateID, the exemplary transmission parameters illustrated in FIG. 10 provide for greater control and flexibility. For example, the RateInfo field can accommodate frames in both legacy and HT (high throughput) mode formats.

A 1-bit format subfield 134 identifies whether the frame is in a legacy mode or HT (high throughput) mode format. Short guard interval (ShortGI) and bandwidth (BW) subfields 136 and 138, respectively, are both specific to the HT mode format, and described above. The actual transmission rate value is stored in a rate (RateID) subfield 140. The RateID subfield 140 is seven bits wide to accommodate either a 4-bit legacy transmit rate or a 7-bit HT transmission rate. A 2-bit antenna selection (AntSelect) subfield 142 allows for selection of a specific transmit antenna. A preamble (PreambleType) field 144 identifies the preamble type (long or short) for systems that are compatible with legacy IEEE 802.11b standards. A 2-bit active sub-channel selection (ActiveSubCh) subfield allows the selection of the upper or lower sub-channels or both for transmission.

Referring now to FIG. 11, the relevant portion of a Rate Drop Update Register (located in the register module 88) is depicted. It would not be efficient for the rate adaptation module 84 to repeatedly read a rate drop table from memory for each frame transmitted. If consecutive frames use the same rate drop table, the rate adaptation module 84 should be able to use the rate drop table it has already read. This is the case when the pointer 104 for a frame is identical to the pointer 104 for the previous frame. This approach, however, does not account for when the table has been altered in memory 86 after it was first read.

A nonzero value in an UpdateDropTable field 152 within the Rate Drop Update Register forces the rate adaptation module 84 to re-read the rate drop table for the next frame to be transmitted. The UpdateDropTable field 152 is therefore set to one when the memory module 86 is edited. As a result, in addition to checking for changes in consecutive pointer 104 values, the rate adaptation module 84 also checks the status of the Rate Drop Update Register. This ensures that the most updated transmission parameters are applied to each frame.

Figure 12:
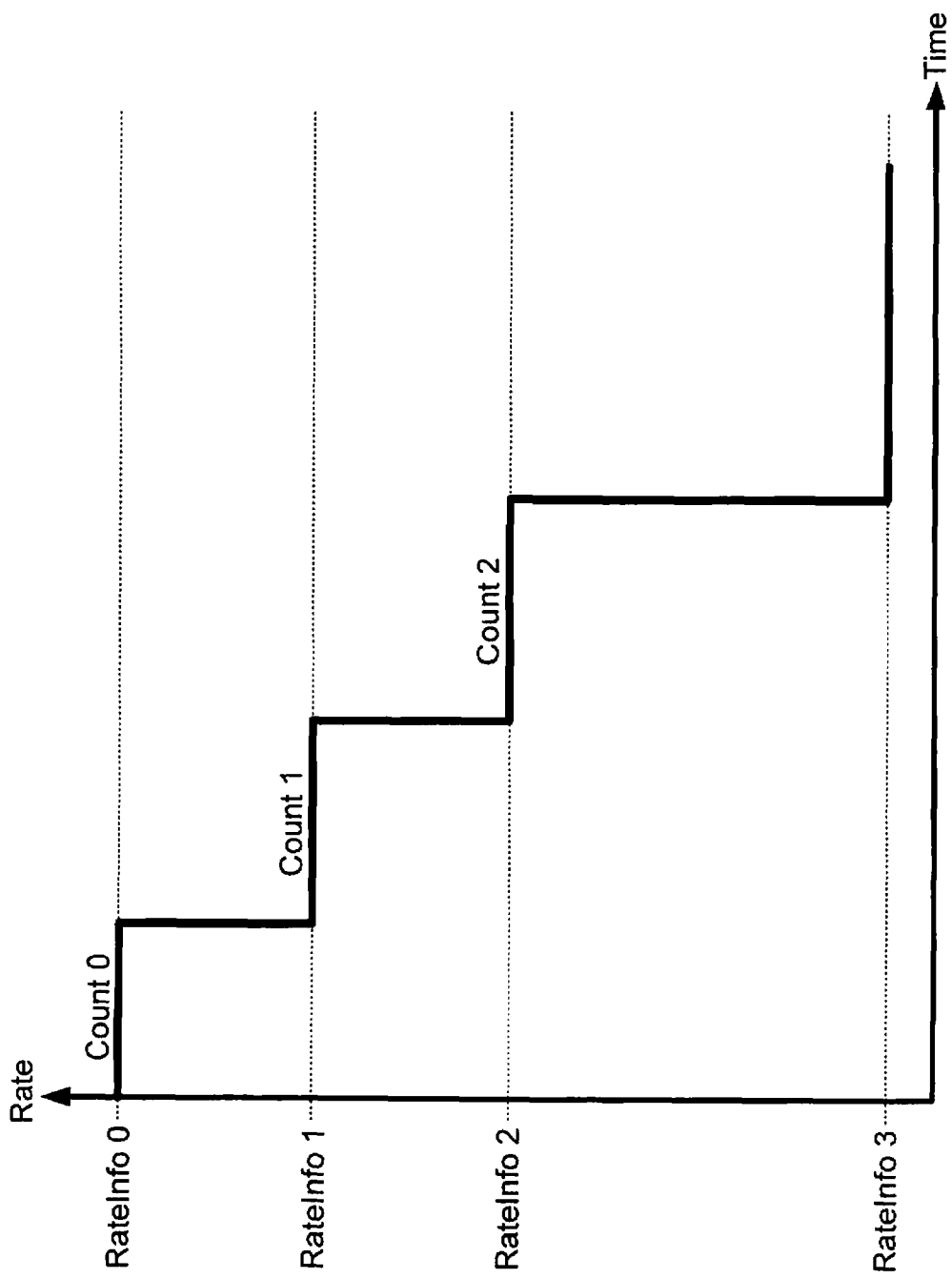
FIG. 12 is a graph conceptually illustrating transmission parameters as a function of time in a tiered rate adaptation algorithm according to the present invention.

Referring now to FIG. 12, a graphical representation of an exemplary adaptation in transmit rates for a frame is depicted. The MAC device 74 first attempts to transmit the frame using RateInfo 0. After Count 0 unsuccessful attempts, the MAC device 74 attempts to transmit the frame using RateInfo 1. If an additional Count 1 attempts are unsuccessful, transmission is attempted using RateInfo 2. Once the final RateInfo (here, 3) is reached, the frame may be dropped and/or stored in a queue reserved for unsuccessfully transmitted frames. In various implementations, a single queue (DoneQ) stores pointers for all transmitted frames, whether passed or dropped. A status field in the transmission information part of each frame is updated by the MAC 84 to indicate pass/drop status, and a failure code subfield indicating the reason for the drop may be included.

Figure 13:
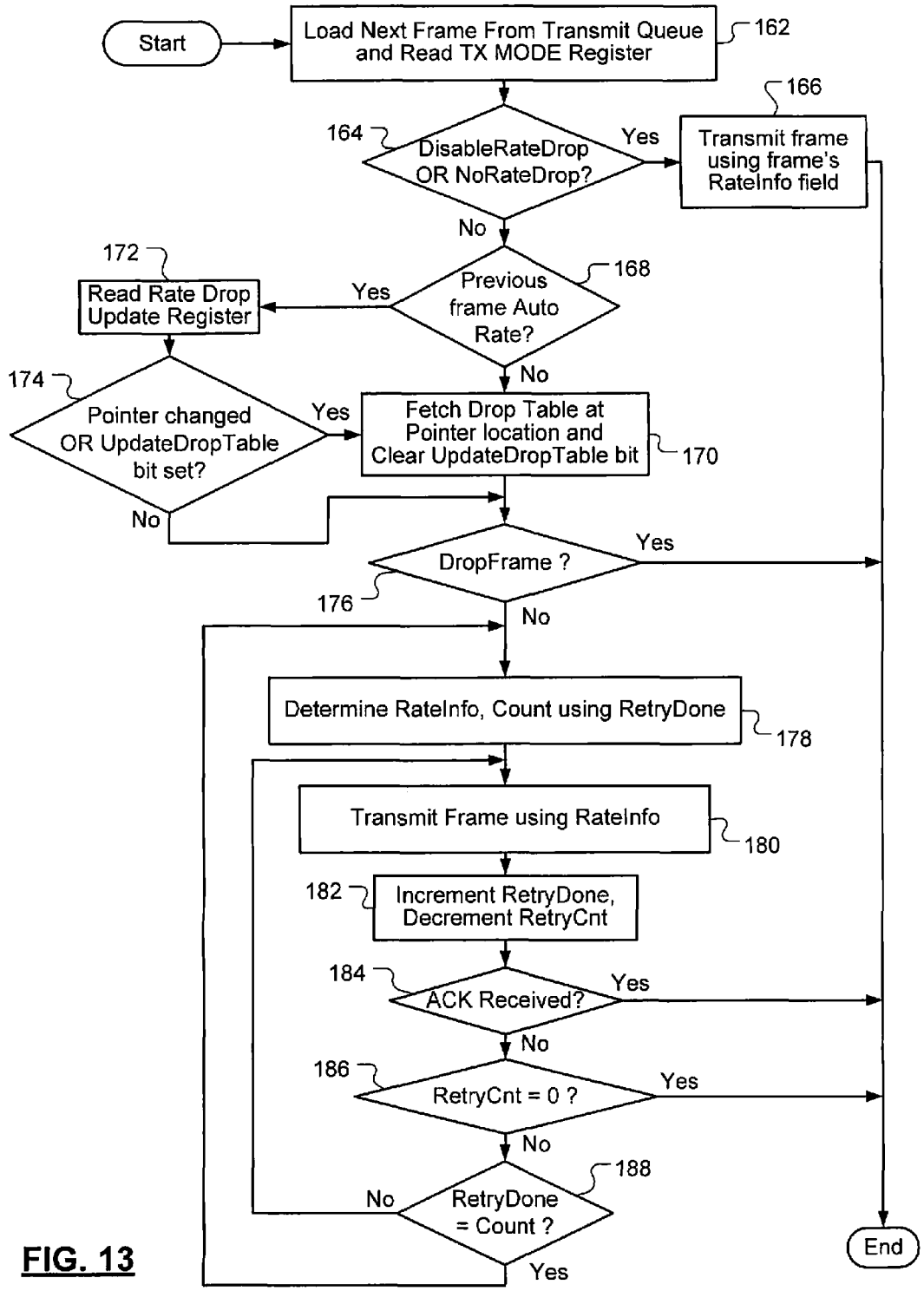
FIG. 13 is a flowchart illustrating exemplary steps performed by the rate adaptation module of FIG. 5 for each frame transmitted.

Referring now to FIG. 13, a rate adaptation algorithm begins in step 162, where the frame to be transmitted next is read from the transmit queue 82. Control also reads the TX MODE register. In step 164, control determines whether the DisableRateDrop bit 96 of the TX MODE register is set and whether the NoRateDrop bit 114 (of the frame's transmission information) is set. If either bit is set, automatic rate adaptation will not be used for this frame and control transfers to step 166; otherwise, control transfers to step 168. In step 166, control transmits the frame using the parameters set in the frame's RateInfo field 106 and control ends.

In step 168, control determines whether the previously transmitted frame used automatic rate adaptation. If not, a drop table will need to be fetched and control transfers to step 170. If the previous frame did use auto rate adaptation, control transfers to step 172. In step 172, the Rate Drop Update register is read and control transfers to step 174. In step 174, control determines whether the pointer field 104 of the current frame is different than the previous frame and determines whether the UpdateDropTable bit 152 of the Rate Drop Update register is set. If either condition is true, a new drop table needs to be fetched and control transfers to step 170; otherwise, control transfers to step 176.

In step 170, a drop table is fetched from memory at the location referenced by the frame's pointer field 104 and the UpdateDropTable bit 152 is cleared. Control then continues at step 176, where control determines whether the DropFrame bit 126 (of the drop table's first RateChange field) is set. If the bit is set, the frame is dropped and control ends; otherwise, control transfers to step 178.

In step 178, variables RateInfo and Count are determined using the frame's current value of RetryDone and the fetched drop table. These variables can be determined, for an exemplary eight-tier implementation, using the following pseudocode:

if (retryDone<(Count=Count[0]))
   RateInfo=RateInfo[0];

else if (retryDone<(Count+=Count[1])
   RateInfo=RateInfo[1];

else if (retryDone<(Count +=Count[2]))
   RateInfo=RateInfo[2];

else if (retryDone<(Count+=Count[3]))
   RateInfo=RateInfo[3];

else if (retryDone<(Count+=Count[4]))
   RateInfo=RateInfo[4];

else if (retryDone<(Count+=Count[5]))
   RateInfo=RateInfo[5];

else if (retryDone<(Count+=Count[6]))
   RateInfo=RateInfo[6];

else {
   Count=0;
   RateInfo=RateInfo[7];
}

In the foregoing pseudocode, RateInfo[n] refers to the RateInfo for the nth drop table entry (nth RateChange field). Likewise, Count[n] refers to the Count value for the nth drop table entry (nth RateChange field). The += operator adds the value to the right of the operator to the value to the left of the operator and stores the result in the variable to the left of the operator. In this way, Count represents the cumulative number of retries before the corresponding tier of the drop table is exhausted, while Count[n] represents only the number of retries within the current tier. For the last tier, Count is set to 0 because there is no end to the last tier—the frame will continue to be transmitted until the overall limit on retries (RetryCnt) is reached.

Control continues in step 180, where control attempts to transmit the frame using the RateInfo parameters determined in step 178. Control continues in step 182, where the frame's RetryCnt field 108 is decremented and the frame's RetryDone field 110 is incremented. Control continues in step 184, where if an acknowledgment (ACK) is received, control ends; otherwise, control transfers to step 186. In step 184, the ACK receipt may be determined in a number of ways, but in one implementation, receipt is determined after a specified period of time (timeout).

In step 186, if RetryCnt is equal to zero, all the retries for this frame have been exhausted and control ends; otherwise, control transfers to step 188. In step 188, control compares RetryDone to the value of Count determined in step 178. If RetryDone is not equal to Count, the next retry will be attempted using the current RateInfo, and control returns to step 180. If RetryDone is equal to Count, the number of retries has been exhausted for the current rate drop table tier, and control returns to step 178 to determine the new RateInfo and Count.

Figure 14B:
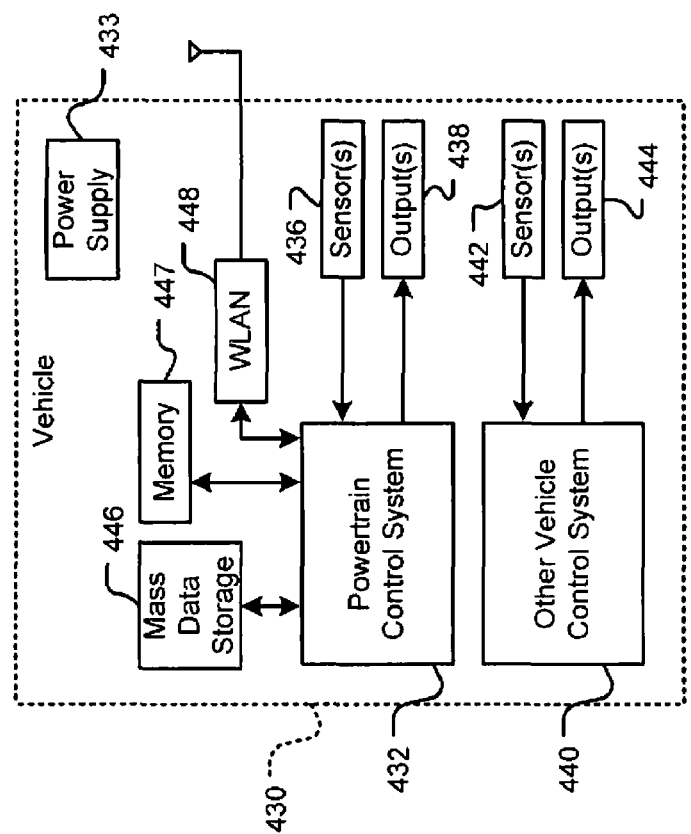
FIG. 14B is a functional block diagram of a vehicle control system.
Figure 14A:
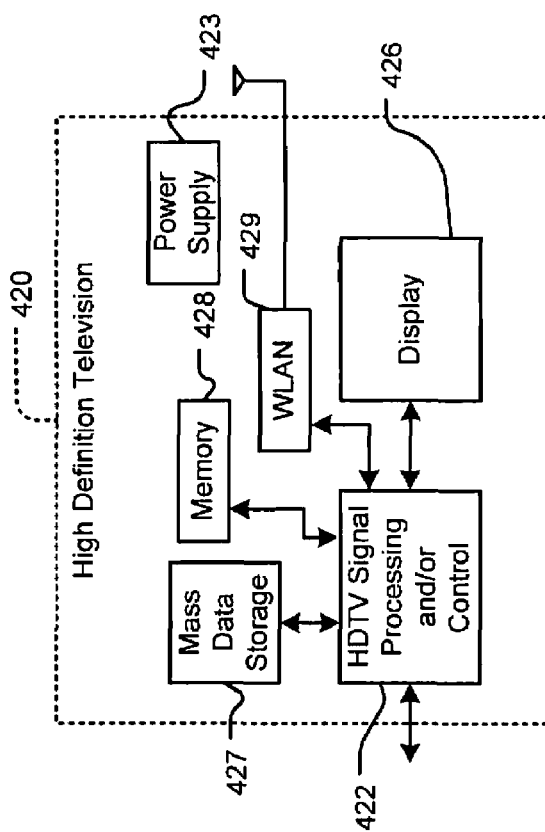
FIG. 14A is a functional block diagram of a high definition television.

Referring now to FIGS. 14A-14E, various exemplary implementations of the present invention are shown. Referring now to FIG. 14A, the present invention can be implemented in a high definition television (HDTV) 420. For example, the present invention may implement and/or be implemented in a WLAN interface 429 of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. For example, the mass data storage 427 may include a hard disk drive (HDD) and/or a mini HDD that includes one or more platters having a diameter that is smaller than approximately 1.8". The HDTV 420 may be connected to memory 428 such as RAM, ROM, low latency nonvolatile memory such as flash memory, and/or other suitable electronic data storage. The HDTV 420 also may support connections with a WLAN via the WLAN network interface 429.

Referring now to FIG. 14B, the present invention may be implemented in a vehicle 430. For example, the present invention may implement and/or be implemented in a WLAN interface 448 of the vehicle 430. In some implementations, the present invention may be implemented in a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices, for example hard disk drives HDD and/or DVDs. At least one HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via the WLAN network interface 448. The control system 440 may also include mass data storage, memory, and/or a WLAN interface (all not shown).

Figure 14C:
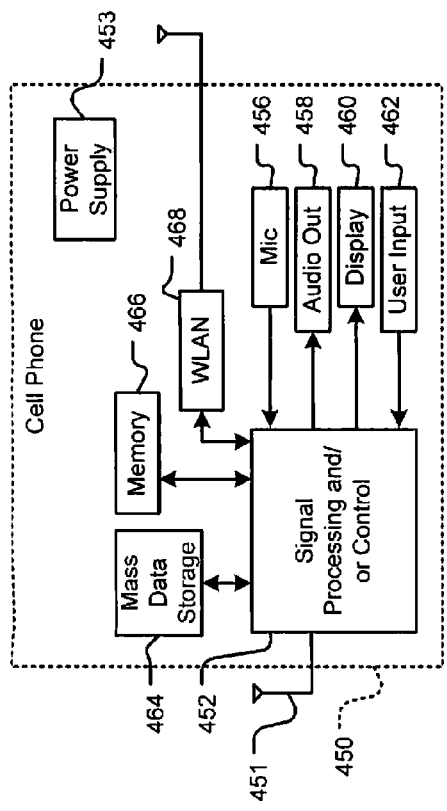
FIG. 14C is a functional block diagram of a cellular phone.

Referring now to FIG. 14C, the present invention can be implemented in a cellular phone 450 that may include a cellular antenna 451. For example, the present invention may implement and/or be implemented in a WLAN interface 468 of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. At least one HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via the WLAN network interface 468.

Figure 14D:
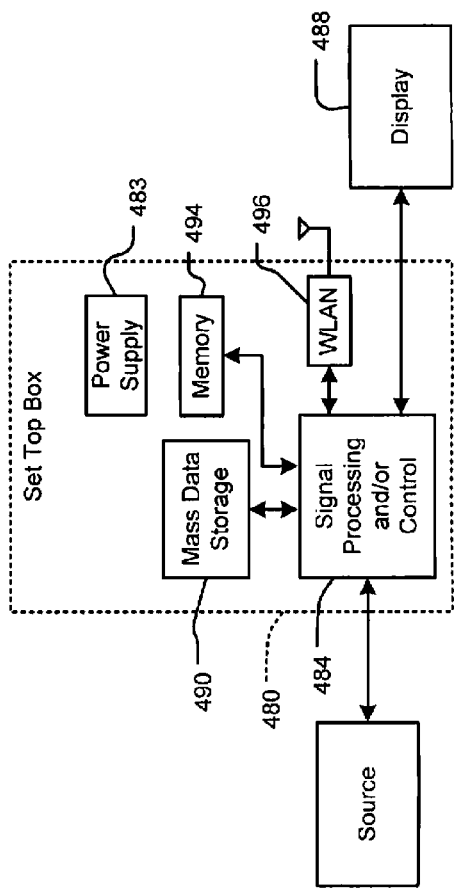
FIG. 14D is a functional block diagram of a set top box.

Referring now to FIG. 14D, the present invention can be implemented in a set top box 480. For example, the present invention may implement and/or be implemented in a WLAN interface 496 of the set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices, for example hard disk drives HDD and/or DVDs. At least one HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via the WLAN network interface 496.

Figure 14E:
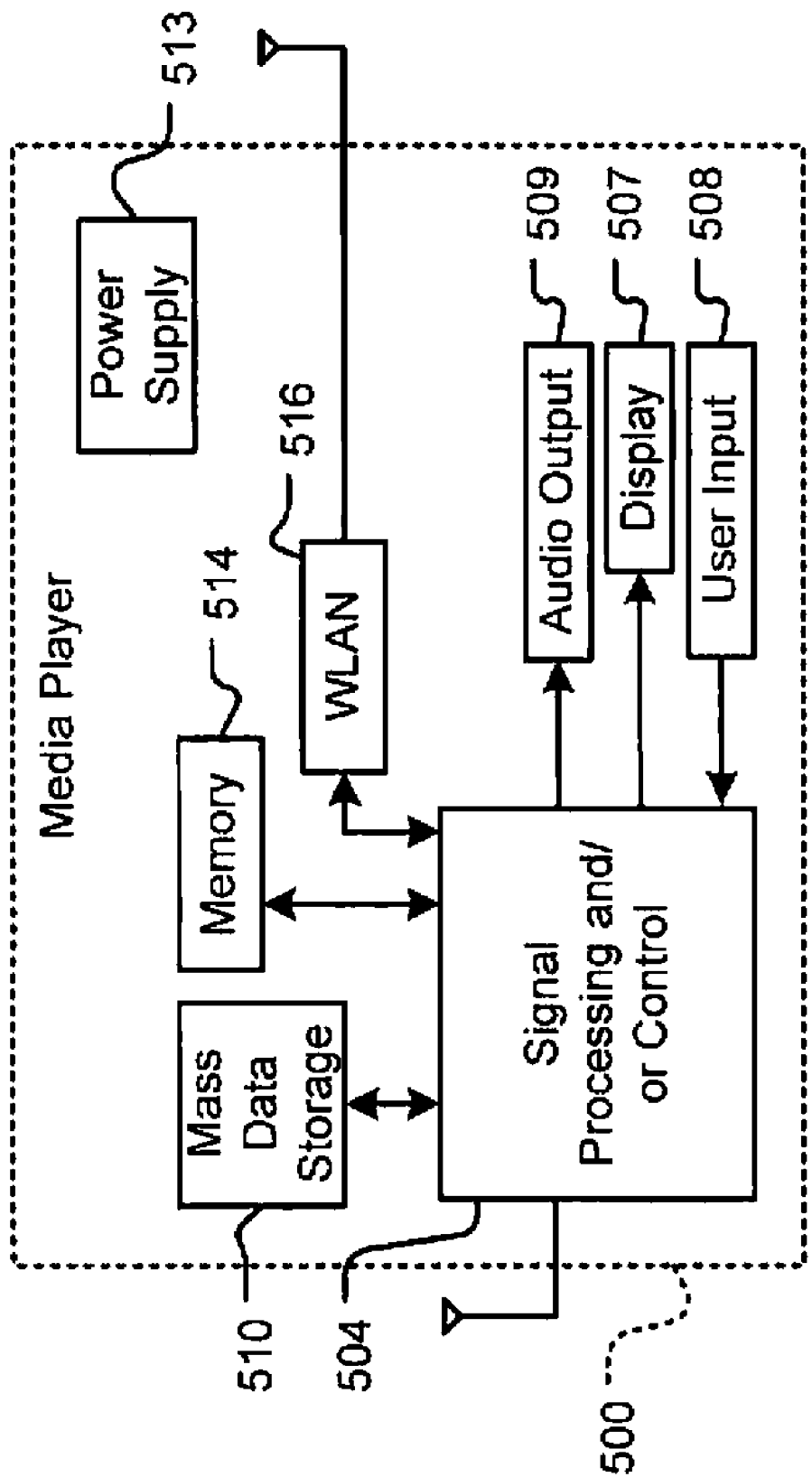
FIG. 14E is a functional block diagram of a media player.

Referring now to FIG. 14E, the present invention can be implemented in a media player 500. For example, the present invention may implement and/or be implemented in a WLAN interface 516 of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via the WLAN network interface 516. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A medium access control device comprising:
a memory configured to store a plurality of sets of transmission parameters and a plurality of count values;

a queue module configured to store a plurality of frames; and a control module configured to
- receive a first frame of the plurality of frames from the queue module,
- transmit the first frame using a first transmission parameter set of the plurality of sets of transmission parameters until at least one of successful transmission occurs, a number of unsuccessful transmissions is equal to one of the plurality of count values associated with the first transmission parameter set, and a predetermined period expires, and
- transmit the first frame using a second transmission parameter set of the plurality of sets of transmission parameters in response to the first frame not being transmitted based on the first transmission parameter set, wherein each of the first transmission parameter set and the second transmission parameter set comprises a plurality of transmission parameters.

2. The medium access control device of claim 1, wherein the plurality of sets of transmission parameters comprises a transmission rate.

3. The medium access control device of claim 2, wherein the plurality of sets of transmission parameters further includes at least one of guard interval selection, antenna selection, preamble type, and bandwidth.

4. The medium access control device of claim 1, wherein:
the control module includes a frame drop indicator; and
the control module is configured to selectively drop the first frame based upon the frame drop indicator.

5. The medium access control device of claim 1, wherein the first frame is stored in the queue module with a fixed transmission parameter specification.

6. The medium access control device of claim 5, wherein:
the plurality of frames are stored with a rate adaptation override indicator; and
based upon the rate adaptation override indicator, the control module is configured to attempt to transmit the first frame using the fixed specification instead of one of the plurality of sets of transmission parameters.

7. The medium access control device of claim 1, wherein:
the control module includes a rate adaptation override indicator,
the plurality of frames are stored in the queue module with a respective fixed transmission parameter specification, and
based upon the rate adaptation override indicator, the control module is configured to attempt transmission of the plurality of frames using a respective fixed specification instead of using one of the plurality of sets of transmission parameters.

8. The medium access control device of claim 1, wherein the control module is configured to:
iteratively attempt to transmit the first frame using one of the plurality of sets of transmission parameters for a respective one of the count values and thereafter to repeat using a next one of the plurality of sets of transmission parameters, and
continue iteration until the plurality of sets of transmission parameters have been used or transmission is successful.

9. The medium access control device of claim 1, further comprising a counter configured to update when transmission of the first frame is unsuccessful.

10. The medium access control device of claim 9, wherein attempted transmission is unsuccessful when an acknowledgement is not received.

11. The medium access control device of claim 9, wherein the plurality of frames are stored in the queue module with a remaining count value indicating a total number of transmission attempts remaining.

12. The medium access control device of claim 11, wherein the control module is configured to count transmission of a frame as failed when a respective remaining count value reaches zero.

13. The medium access control device of claim 11, wherein the remaining count value is decremented after an unsuccessful transmission attempt.

14. The medium access control device of claim 9, wherein the plurality of frames are stored with a cumulative count value indicating a total number of unsuccessful transmission attempts.

15. The medium access control device of claim 14, wherein when a frame is first stored in the queue module, a respective cumulative count value is set to zero.

16. The medium access control device of claim 14, wherein the cumulative count value is incremented after an unsuccessful transmission attempt.

17. The medium access control device of claim 14, wherein the cumulative count value of a second frame initializes a counter when transmission of the second frame was previously suspended.

18. The medium access control device of claim 1, wherein:
the memory stores a plurality of tables,
the plurality of tables includes the plurality of sets of transmission parameters and the plurality of count values,
the plurality of frames are stored in the queue module with a pointer pointing to a starting address within the memory of one of the plurality of tables.

* * * * *